United States Patent [19]

Galvin

[11] Patent Number: 5,045,842
[45] Date of Patent: Sep. 3, 1991

[54] COMPUTER INPUT DEVICE

[76] Inventor: James J. Galvin, 111 Kirby Ave., Bellevue, Nebr. 68005

[21] Appl. No.: 425,062

[22] Filed: Oct. 23, 1989

[51] Int. Cl.⁵ .............................................. G09G 5/08
[52] U.S. Cl. .................................. 340/709; 340/710; 74/471 XY
[58] Field of Search ....................... 340/710, 709, 706; 250/6 A, 6 R; 74/471 XY; 358/255

[56] References Cited

U.S. PATENT DOCUMENTS

| | | | |
|---|---|---|---|
| 4,285,523 | 8/1984 | Lemelson | 358/255 |
| 4,439,648 | 3/1984 | Reiner et al. | 200/6 A |
| 4,514,600 | 4/1985 | Lentz | 200/6 A |
| 4,580,006 | 4/1986 | Hull | 178/18 |
| 4,633,167 | 12/1986 | Kittz | 340/709 |
| 4,738,417 | 4/1988 | Wenger | 74/471 X |
| 4,831,359 | 5/1989 | Newell | 340/709 |
| 4,862,151 | 8/1989 | Grauz et al. | 340/709 |
| 4,862,165 | 8/1989 | Gart | 340/710 |

Primary Examiner—Alvin E. Oberley
Attorney, Agent, or Firm—Michael I. Kroll

[57] ABSTRACT

An inputting device for a computer is disclosed. The inputting device includes a box-like housing, has a top, a bottom, a first side, a second side, a palm pad cup movably disposed on the top of the box like housing, an automatic firing bottom disposed on the second side of the box like housing, a manual firing bottom disposed on the first side of the box like housing, four suction cups disposed on the bottom of the box like housing so that the inputting device for the computer will not move, and sufficient wire necessary for connecting the computer inputting device to the computer.

10 Claims, 2 Drawing Sheets

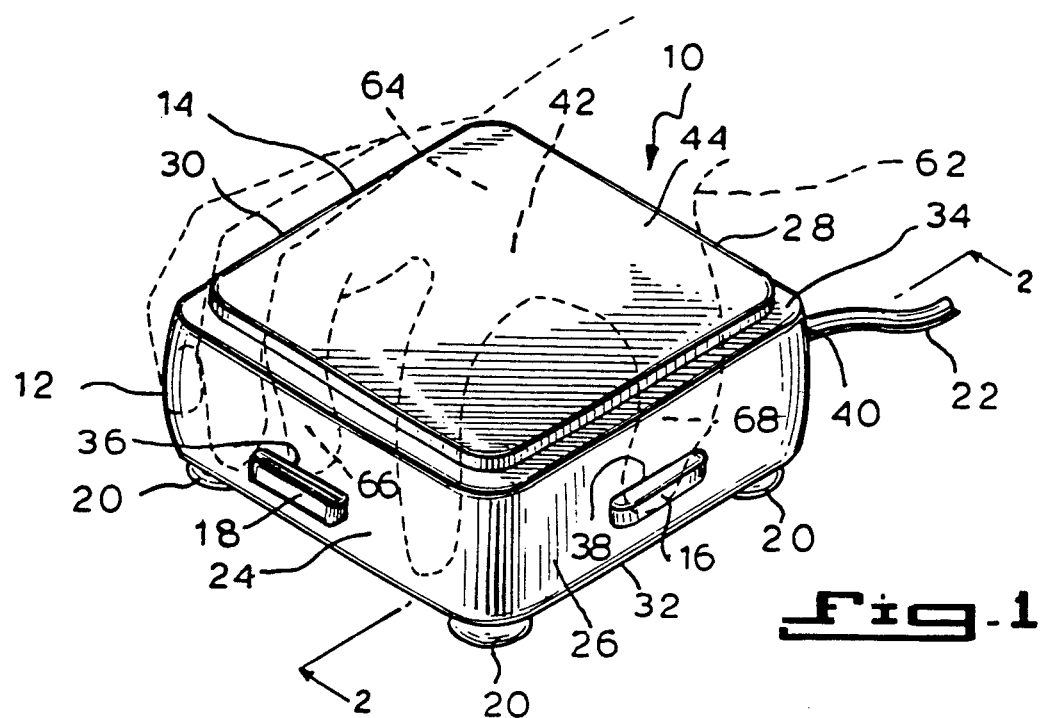
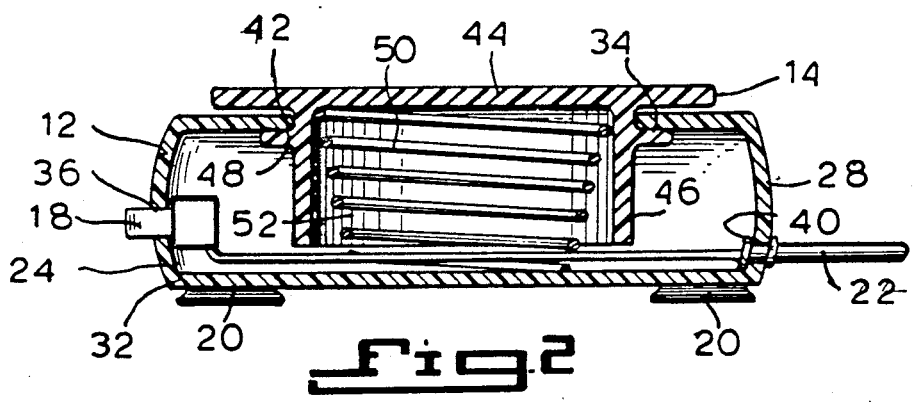
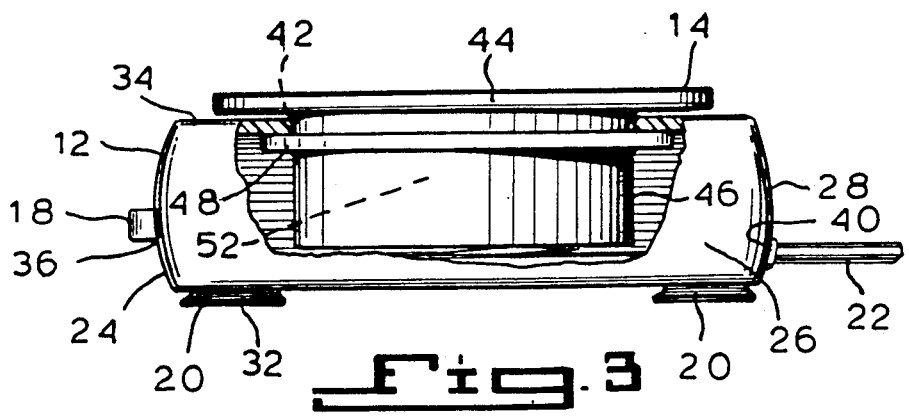

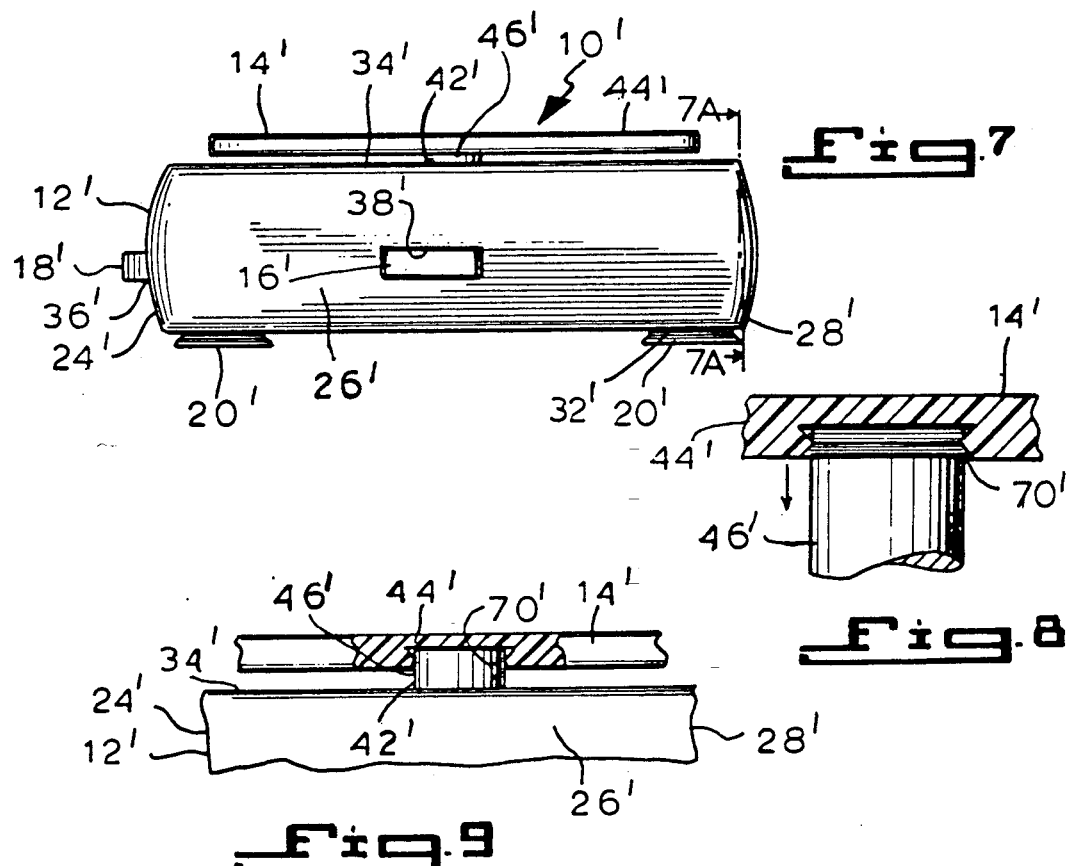

COMPUTER INPUT DEVICE

BACKGROUND OF THE INVENTION

1. Field of the Invention

The present invention relates to a computer input device.

More particularly, the present invention relates to a computer input device, similar to a joystick or mouse, but uses palm pressure rather than the wrist for the input.

2. Description of the Prior Art

Much of the interaction between computers and human operators centers on a flashing marker, or cursor, that appears on a computer's video screen. The cursor indicates where the next action will be displayed and moves in response to commands from the keyboard. For example, typing a character moves the cursor one position to the right; striking one of the specially designated cursor keys can move the marker in one of four directions—up, down, left or right.

The most widely used alternative pointing device is the mouse, held in the hand and pushed along a flat surface. It will move the cursor in any direction on the screen. Mice come in two basic versions, optical and mechanical. Buttons on the housing allow the user to select a command from a displayed menu, for example, or determine the end point of a line drawn on the screen.

Devices often used as controllers for games and graphics include thumbwheels, joysticks and trackballs. Thumbwheels, which move the cursor in either direction along one axis, are used in pairs to propel the cursor in as many as eight directions. Newer digital models maneuver it in any direction, as do analog joysticks and trackballs.

A cursor's position at the end of a move depends on whether or not the controller's range of motion bears an absolute correspondence to the area of the screen. With an absolute joystick, for example, moving the stick to its lower left position moves the cursor to the screen's lower left. With a so-called rate joystick, however, pushing the stick to the left moves the cursor to the left of where it was, but not to a particular spot on the screen. Absolute devices are thus more effective for rapid, gross movement of the cursor, rate devices give finer control. Some devices can be switched from one mode to the other.

Numerous innovations for computer input devices have been provided in the prior art that are adapted to be used. Even though these innovations may be suitable for the specific individual purposes to which they address, they would not be suitable for the purposes of the present invention as heretofore described.

SUMMARY OF THE INVENTION

Accordingly, it is an object of the present invention to provide a computer input device which avoids the disadvantages of the prior art.

More particularly, it is an object of the present invention to provide a computer input device which uses a palm pad in place of a traditional joystick, avoids user pain in the arm that occurs when using a joystick. When the input device of the present invention is used for extended periods of time uses of the housing are so shaped to avoid the need for gripping, requires only a minimal amount of pressure to operate the palm pad, and readily adaptable for use by the handicapped, used to replace the mouse input device. Much less space is required for the present invention.

The present invention is a device used to control computer games or can be used as another type of input device for a computer. The present invention utilizes the action in the palm of the hand for control. This is done through the use of a small plastic case measuring approximately four to four and one-half inches square by three inches high. The case has a spring-loaded plastic palm pad that is connected to contacts inside the device to provide computer signals via an output port with wires to the computer. Rubber suction cups on the bottom of the device hold it steady and in place. A "firing button" is placed on the front of the device for use by the forefinger. This alleviates the muscle strain that occurs using a typical joystick.

In keeping with these objects, and with others which will become apparent hereinafter, one feature of the present invention resides, briefly stated, in an inputting device for a computer, including a box-like housing having a top and a bottom, and a first side and a second side, a palm pad cup movably disposed on said top of the box like housing, an automatic firing bottom disposed on the second side of the box like housing, a manual firing bottom disposed on the first side of the box like housing, four suction cups disposed on the bottom of the box like housing so that the inputting device for the computer will not move, and sufficient wire necessary for connecting the computer inputting device to the computer.

In accordance with another feature of the present invention, the box like housing is substantially square shaped and includes a first side, a second side, a third side, a fourth side, a bottom, and a top.

Another feature of the present invention is that the box like housing is plastic.

Yet another feature of the present invention is that the first side contains a first substantially centrally rectangular cutout, the second side contains a second substantially centrally rectangular cutout, the third side contains a third cutout, the bottom has the four suction cups disposed thereon, and the top contains a fourth substantially centrally circular cutout.

Still another feature of the present invention is that it further comprises a coil spring disposed in the hollow interior of the palm pad cup.

Yet still another feature of the present invention is that it further comprises a lip encircling the palm pad cup and retaining the palm pad cup within the box like housing.

Still yet another feature of the present invention is that the coil spring holds the palm pad above the electronic components inside the palm pad cup.

Another feature of the present invention is that the palm pad cup has a substantially square pad with a substantially hollow circular portion descending downwardly therefrom.

Yet another feature of the present invention is that the substantially square pad, the substantially circular portion, and the lip, all being of the palm pad cup are prepared as one homogeneous unit.

Still another feature of the present invention is that the one homogeneous unit of the palm pad cup is made out of plastic.

Yet still another feature of the present invention is that the coil spring biases the palm pad cup in an upwardly direction until the lip of the palm pad cup contacts the top of the box like housing.

Still yet another feature of the present invention is that it further comprises a first button disposed through the cutout contained in the first side of the box like housing so that individual firing can be accomplished.

Another feature of the present invention is that it further comprises a second button disposed through the cutout contained in the first side of the box like housing so that automatic firing can be accomplished.

Yet another feature of the present invention is that it further comprises a wire exiting the box like housing through the third cutout contained in the third side and attaching to a computer.

In keeping with these objects, and with others which will become apparent hereinafter, one feature of the present invention resides, briefly stated, in an inputting device for a computer, comprising a boxlike housing having a top, a first side, a second side, and a bottom, a palm pad movably disposed on the top of the box like housing, an automatic firing button disposed on the second side of the box like housing, a manual firing bottom disposed on the first side of the box like housing, four suction cups disposed on the bottom of the box like housing so that the inputting device for the computer will not move, and sufficient wire necessary for connecting the computer inputting device to the computer.

In accordance with another feature of the present invention, the box like housing is substantially square shaped and includes a first side, a second side, a bottom, and a top.

Another feature of the present invention is that the box like housing is plastic.

Yet another feature of the present invention is that the palm pad is mounted on a joystick stub.

Still another feature of the present invention is that the first side contains a first substantially centrally rectangular cutout, the second side contains a second substantially centrally rectangular cutout, the third side contains a third cutout, the bottom has the four suction cups disposed thereon, and the top contains a fourth substantially centrally circular cutout.

Yet still another feature of the present invention is that it further comprises a first button disposed through the cutout contained in the first side of the box like housing so that individual firing can be accomplished.

Still yet another feature of the present invention is that it further comprises a second button disposed through the cutout contained in the second side of the box like housing so that automatic firing can be accomplished.

Another feature of the present invention is that it further comprises a wire exiting the box like housing through the third cutout contained in the third side and attaching to a computer.

The novel features which are considered characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

BRIEF DESCRIPTION OF THE DRAWING

FIG. 1 is a perspective view of the computer input device of the present invention being operated by a hand shown in phantom;

FIG. 2 is a cross-sectional side view of the computer input device of the present invention taken along line 2—2 in FIG. 1, and which shows the housing, the palm pad, and a spring for keeping the palm pad in proper position relative to the housing;

FIG. 3 is a side view of the computer input device of the present invention with a part of the outside housing broken away so that the interior can be viewed.

FIG. 4 is a side view of the coil spring, seen in FIG. 2, and which holds the palm pad above the electronic pad;

FIG. 5 is a perspective view of a conventional joy stick known in the prior art;

FIG. 6 is a perspective view of the computer input device shown with a joy stick in phantom;

FIG. 7 is an alternate embodiment of the computer input device of the present invention, in which the palm pad is affixed to the stub of the previously removed joy stick;

FIG. 7A is a cross-sectional view taken in the direction of line 7A in FIG. 7;

FIG. 8 is a cross-sectional view of the joint of the palm pad and the joy stick stub, as shown in FIG. 7;

FIG. 9 is a cross-sectional view of the joint of the palm pad and the joy stick stub, as shown in FIG. 7.

LIST OF REFERENCE NUMERALS UTILIZED IN THE DRAWING

10—computer input device
12—box like housing
14—palm pad cup
16—automatic firing button
18—manual firing button
20—four suction cups
22—wire to computer
24—first side of the box like housing 12
26—second side of the box like housing 12
28—third side of the box like housing 12
30—fourth side of the box like housing 12
32—bottom side of the box like housing 12
34—top side of the box like housing 12
36—first substantially centrally rectangular cut out
38—second substantially centrally rectangular cut out
40—third cut out
42—fourth cut out
44—substantially square pad
46—substantially circular portion
48—circular lip
50—coil spring
52—hollow interior
54—prior art joystick
56—grip
58—post
60—port
62—hand of the user
64—palm of the user
66—third finger of the user
68—thumb of the user
70—recess
10'—computer input device
12'—box like housing
14'—palm pad cup
16'—automatic firing button
18'—annual firing button
20'—four suction cups
22'—wire to computer
24'—first side of the box like housing 12'
26'—second side of the box like housing 12'

28'—third side of the box like housing 12'
30'—fourth side of the box like housing 12'
32'—bottom side of the box like housing 12'
34'—top side of the box like housing 12'
36'—first substantially centrally rectangular cut out
38'—second substantially centrally rectangular cut out
40'—third cut out
42'—fourth cut out
44'—substantially square pad
46'—substantially circular stub

DETAILED DESCRIPTION OF THE PREFERRED EMBODIMENT

The present invention involves modification to a joystick. The stick of the joystick, is replaced with a palm pad, yet still retaining the same functions. The interior electronic components can remain the same or can be modified.

The mechanical components are to be changed as is the present invention. This would improve the life of the present invention.

The present invention involves cutting the joy stick down to a stub, and affixing the palm pad on the stub of the old joystick. The palm pad cup interior is hollow and allows for fit of a coil spring.

The lip encircling the palm pad cup retains the palm pad cup within the box-like housing while holding the components.

The coil spring is used to hold the palm pad above the electronic components inside the palm pad cup.

The palm pad is mounted on a traditional joystick post (stub) and using the same interior as the joystick.

The pain developed in the arm from extensive use of a joystick is caused by a form of tendenitis. Medical doctors have stated that a cure for this form of tendenitis is to reduce or eliminate the use of the joystick.

It is to be known that the present invention makes no claims of curing this ailment. However, proper use of the present invention will make the ailment less likely to occur.

Referring now to FIG. 1, the preferred embodiment of the computer input device of the present invention is shown generally at 10 and includes a box-like housing 12, a palm pad cup 14, an automatic firing button 16, a manual firing button 18, four suction cups 20, and a wire 22 for connecting the computer input device 10 to a computer (not shown).

As can be seen in FIGS. 1 through 3, the box-like housing 12 is substantially square shaped and includes a first side 24, a second side 26, a third side 28, and a fourth side 30. Additionally, included is a bottom 32, and a top 34. The box like housing 12 is made out of plastic, but is not limited to it.

The first side 24 contains a first substantially centrally rectangular cut out 36, the second side 26 contains a second substantially centrally rectangular cut out 38, the third side 28 contains a third cut out 40, the bottom 32 has the four suction cups 20 disposed thereon, and the top 34 contains a fourth substantially centrally circular cut out 42. The four suction cups are made out of rubber, but are not limited to it.

The FIGS. 1 through 3, show the palm pad cup 14 in the preferred embodiment. The palm pad cup 14 has a substantially square pad 44 with a substantially hollow circular portion 46 descending downwardly therefrom. A circular lip 48 is disposed around the substantially hollow circular portion 46.

As shown in FIG. 2, the substantially square pad 44, the substantially hollow circular portion 46, and the circular lip 48, all being of the palm pad cup 14, are prepared as one homogeneous unit made out of plastic, but is not limited to it.

A coil spring 50 is disposed in the hollow interior 52 of the substantially hollow circular portion 46. The coil spring 50 biases the palm pad cup 14 is an upwardly direction until the lip 48 contacts the top 34.

A first button 18, disposed through the cut out 36 of the first side 24, is the first firing button for individual firing. A second button 16, disposed through the cut out 38 of the second side 26, is the second firing button for automatic firing.

The wire 22 exists the box like housing 12 through the third cut out 40 contained in the third side 28 and is attached to the computer (not shown).

FIG. 5 shows a configuration of the prior art joystick 54. The prior art joy stick 54 includes a grip 56, a post 58, and a port 60.

FIGS. 6 through 9 show the alternate embodiment of the computer input device 10'. The computer input device 10' includes a box like housing 12', a palm pad 14', an automatic firing button 16', a manual firing button 18', four suction cups 20', and a wire 22' connecting the computer input device 10' to a computer (not shown).

As can be seen in FIGS. 6 through 9, the box like housing 12' is substantially square shaped and includes a first side 24', a second side 26', a third side 28', and a fourth side (not shown). Additionally, included is a bottom 32' and a top 34'.

The first side 24' contains a first substantially rectangular cut out 36', the second side 26' contains a second substantially rectangular cut out 38', the third side 28' contains a third cut out 40', the bottom 32' has the four suction cups 20' disposed thereon, and the top 34' contains a fourth substantially centrally circular cut out 42'.

The FIGS. 6 through 9 show the palm pad 14' in the alternate embodiment. The palm pad 14' is a substantially square pad 44' with a substantially circular portion 46' taken from the post 58 of the prior art joy stick 54. The stub 46' descends downwardly from the palm pad 14'.

As shown in FIGS. 8 and 9, the substantially square pad 44', and the substantially circular stub 46', are prepared as two individual parts that connect by having the substantially circular stub 46' be substantially permanently affixed in the recess 70' of the square pad 44'.

In operation, as shown in FIG. 1, the computer input device 10 operates by having the user place the palm 64 of the hand 62 on the palm pad 14 so that the palm pad 14 can be operated by the palm 64 of the hand 62 of the user. The manual firing button 18 is operated by the third finger 66 of the hand 62. The automatic firing button 16 is operated by the thumb 68 of the hand 62.

The standard mouse is movably utilized for input. However, the present invention utilizes suction cups to prevent movement when inputting. Traditional mouse and the present invention may contain similar appearances, but not similar functions.

A first button 18', disposed through the cut out 36' of the first side 24', is the first firing button for individual firing. A second button 16', disposed through the cut out 38' of the second side 26', is the second firing button for automatic firing.

A wire 22' exits the box like housing 12' through the third cut out 40' contained in the third side 28', attached to the computer (not shown).

It will be understood that each of the elements described above, or two or more together, may also find a useful application in other types of constructions differing from the type described above.

While the invention has been illustrated and described as embodied in a computer input device, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An inputting device controller for a computer, comprising:
   a) a box-like housing having a top, a bottom, a front, a back, a thumb side, and a side opposite the thumb side, said front containing a first substantially centrally rectangular cutout, said thumb side containing a second substantially centrally rectangular cutout, said back containing a third cutout, and said top containing a substantially centrally circular cutout;
   b) a lip encircling said palm pad cup and retaining said palm pad cup within said box-like housing.
   c) a palm pad cup being movably disposed on said top of said box like housing, said palm pad cup having a flat substantially square pad with a substantially hollow cylindrical portion descending downwardly therefrom, said flat substantially square pad, said substantially cylindrical portion, and said lip, all being of said palm pad cup are made as one homogeneous piece, said substantially square pad fitting in either palm interchangeably;
   d) an automatic firing button being disposed on said thumb side of said box like housing so that automatic firing can be accomplished;
   e) a manual firing button being disposed on said front of said box like housing so that individual firing can be accomplished;
   f) a plurality of suction cups being disposed on said bottom of said box like housing so that the inputting device controller for the computer will not move;
   g) sufficient wire exiting said box-like housing through said third cutout contained in said back and necessary for connecting the computer inputting device controller to the computer; and
   h) a tapered coil spring being disposed in said hollow interior of said palm pad cup, said tapered coil spring tapering toward said bottom of said box-like housing;

2. An inputting device controller as defined in claim 1, wherein said box like housing is substantially square shaped.

3. An inputting device controller as defined in claim 2, wherein said box like housing is plastic.

4. An inputting device controller as defined in claim 2, wherein said tapered coil spring holds said flat substantially square palm pad above the electronic components inside said palm pad cup.

5. An inputting device controller as defined in claim 4, wherein said palm pad cup is made out of plastic.

6. An inputting device controller as defined in claim 5, wherein said tapered coil spring biases said palm pad cup in an upward direction until said lip contacts said top of said box like housing.

7. An inputting device controller for a computer, comprising:
   a) a box-like housing having a top, a a front, a back, a thumb side, and a side opposite the thumb side, said front containing a first substantially centrally rectangular cutout, said thumb side containing a second substantially centrally rectangular cutout, said back containing a third cutout, and said top containing a substantially centrally circular cutout;
   b) a flat substantially square palm pad being movably disposed on said top of said box like housing;
   c) an automatic firing button being disposed on said thumb side of said box like housing;
   d) a manual firing button being disposed on said front of said box like housing;
   e) a plurality of suction cups disposed on said bottom of said box like housing so that the inputting device controller for the computer will not move;
   f) sufficient wire necessary for connecting the computer inputting device controller to the computer;
   g) a first button being disposed through said cutout contained in said front of said box like housing so that individual firing can be accomplished;
   h) a second button disposed through said cutout contained in said thumb side of said box like housing so that automatic firing can be accomplished; and
   i) a wire exiting said box like housing through said third cutout contained in said back and attaching to a computer.

8. An inputting device controller as defined in claim 7, wherein said box like housing is substantially square shaped.

9. An inputting device controller as defined in claim 8, wherein said box like housing is plastic.

10. An inputting device controller as defined in claim 9, wherein said flat substantially square palm pad is mounted on a joystick stub.

* * * * *